March 14, 1967     A. R. CRAWFORD     3,308,647
VIBRATION PICKUP WITH CALIBRATING MEANS
Filed April 21, 1965     2 Sheets-Sheet 1
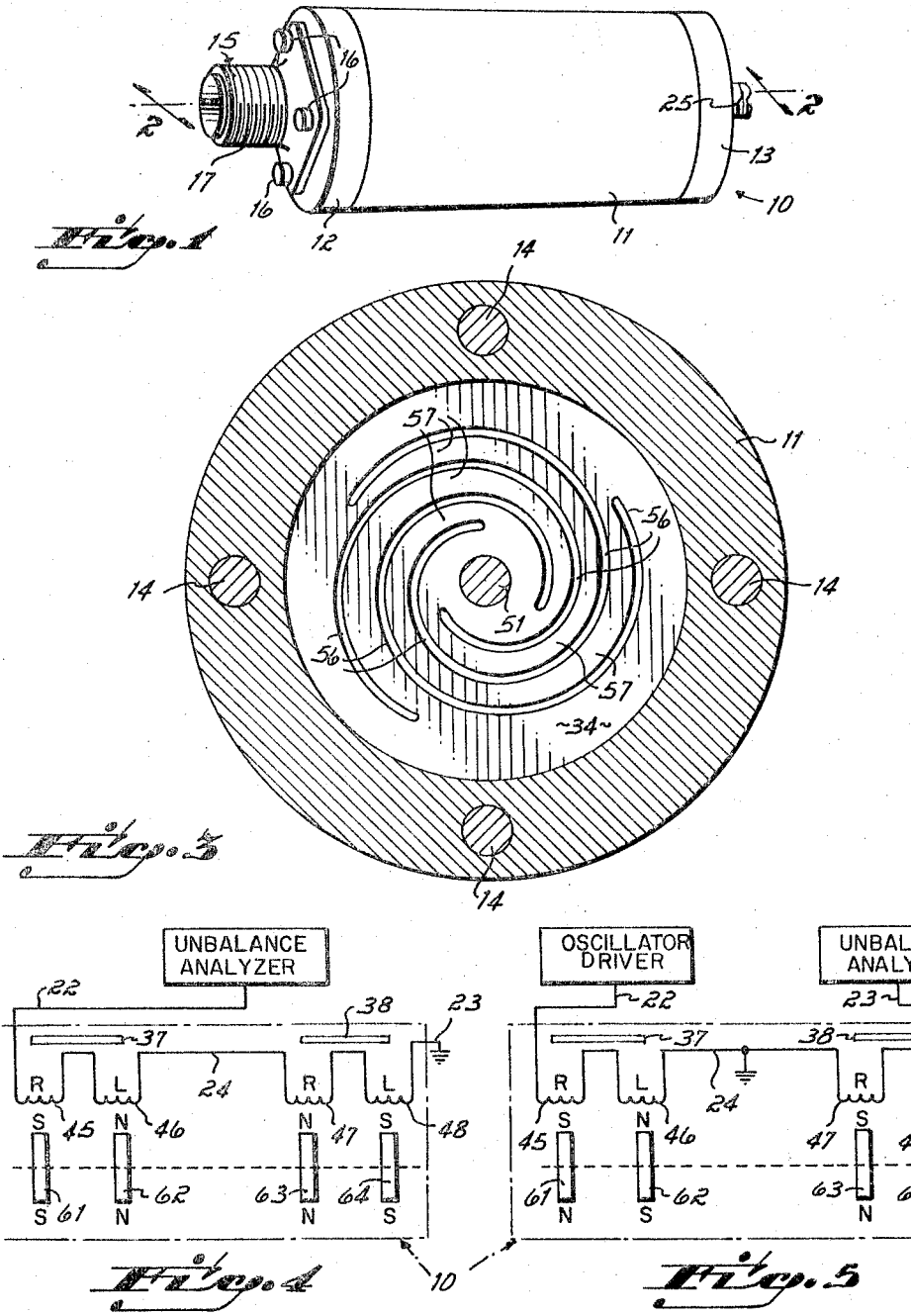
INVENTOR
Arthur R. Crawford
BY
Wood, Herron & Evans
ATTORNEYS

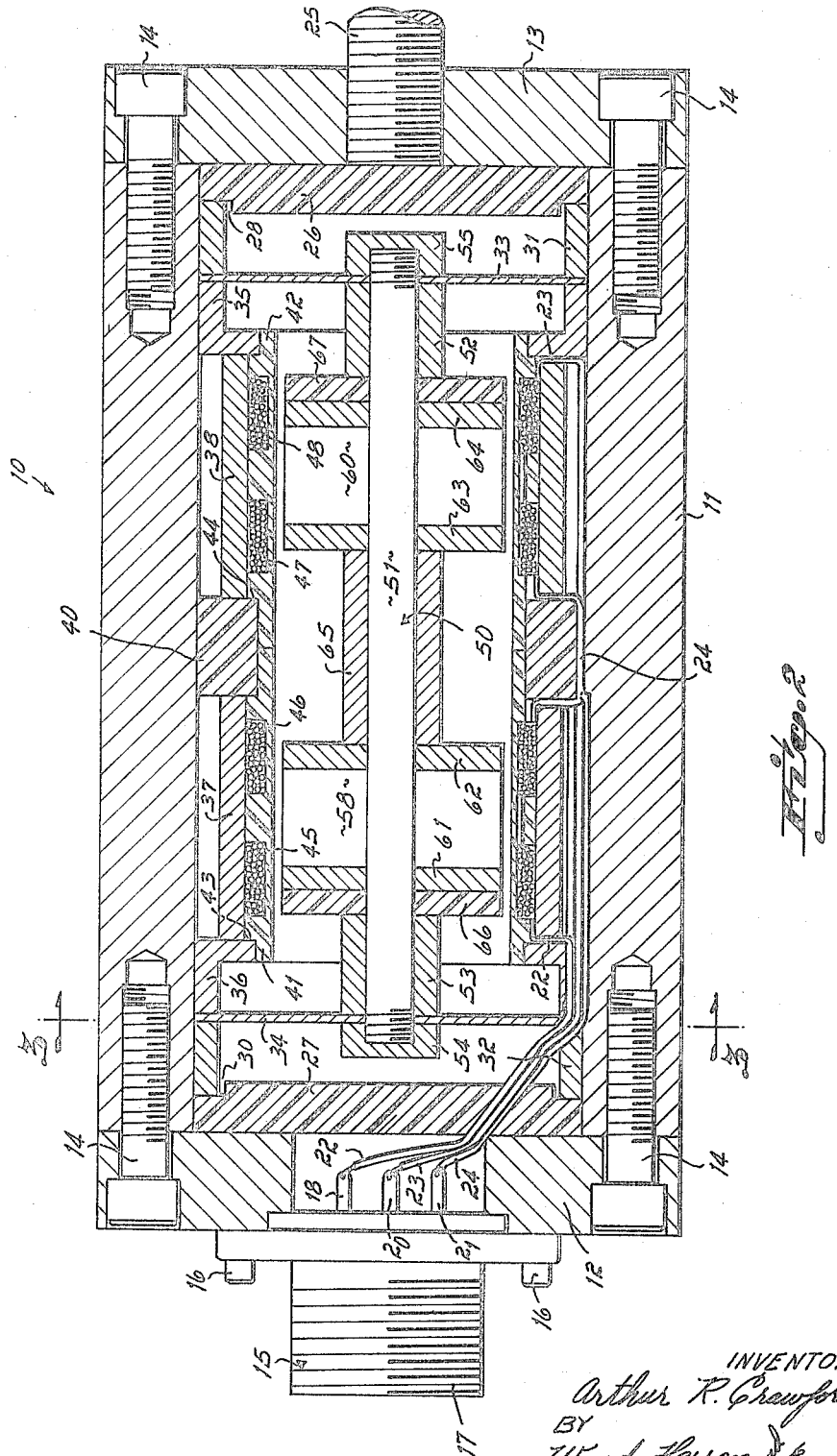

United States Patent Office 3,308,647
Patented Mar. 14, 1967

3,308,647
VIBRATION PICKUP WITH CALIBRATING
MEANS
Arthur R. Crawford, Columbus, Ohio, assignor to Abex
Corporation, a corporation of Delaware
Filed Apr. 21, 1965, Ser. No. 449,802
7 Claims. (Cl. 73—1)

This invention relates to vibration transducers and is particularly directed to a novel vibration pickup for generating a velocity dependent signal correlated with vibrations to which the transducer is subjected.

In the recent past it has become increasingly common in many industries to provide accurate dynamic balancing for various types of devices, such as automobile engines having rotating members, e.g. crankshafts. These devices are tested while operating within various preselected speed ranges determined by various parameters, including the nature of the apparatus being tested and the nature of the support provided for the apparatus during the test procedure. One form of unbalance analyzing apparatus useful in this field is disclosed in the copending application of Richard E. Porter for "Assembly Balancer."

It will readily be appreciated that in many types of plants, for example automobile production plants, it is desirable to provide unbalance analyzing apparatus which can readily be checked periodically to determine that the apparatus is functioning properly and also to provide apparatus in which the setup can be changed to handle different types of engines; for example, six and eight cylinder engines of various sizes.

The principal object of the present invention is to provide a vibration pickup which is useful in connection with unbalance analyzing apparatus and which is provided with means to facilitate checking not only the operation of the transducer, but also the operation of the analyzer as well. Additionally, the present vibration pickup facilitates the recalibration of an analyzer for operation upon one type of engine after the analyzer has been set up and run in the interim on a different type of engine.

More particularly, the present invention is predicated upon the concept of providing a vibration pickup in which relative movement is introduced between a housing and armature assembly in response to vibrations sensed by the transducer when it is mounted upon a device to be analyzed. In one preferred embodiment the housing contains two annular sets of coils, the coils of each set being oppositely wound and surrounding two opposite cylindrical pole pieces carried by an armature. The armature thus carries two longitudinally spaced, permanent magnet assemblies which are rigidly secured to the armature for movement in unison, the armature being supported from the housing by suitable resilient spring means.

In this preferred embodiment, the housing is adapted to be connected directly to the apparatus being tested, such as an engine block, to vibrate therewith. The armature then acts as an inertial member undergoing a much smaller displacement than the housing with the result that the permanent magnets are shifted relative to the two sets of coils.

In accordance with the present invention, suitable switch means are provided for connecting all of the coils in series when the pickup is connected to an engine, or the like, during an analyzing operation. The output signal generated by these coils is then applied to an unbalance analyzer which operates to provide an indication of unbalance and the position of unbalance in the manner described in detail in the above noted Porter application.

Moreover, in accordance with the present invention, the switching means are also selectively effective to connect only one set of coils to the unbalance analyzer while the other set of coils is connected to an oscillator driver. This oscillator driver preferably has a frequency output within the frequency range at which the engine, or other apparatus, is normally tested. When one set of coils is connected to an oscillator and the second set is connected to an analyzer, the vibration pickup can be utilized not only to test its own functioning, but also the functioning of the analyzer as well.

More particularly, the output of the oscillator driver applied to one set of coils applies a driving force to the armature causing the armature to vibrate relative to the housing. This in turn causes a signal to be generated in the second set of coils connected to the unbalance analyzer. The readings of the output meters of the analyzer are noted and checked against readings previously determined during proper operation of the system. If these two sets of readings coincide, the operator is assured that both the pickup and analyzer are operating properly.

A still further advantage of the present vibration pickup is that one or more of the pickups can be utilized, in the manner explained in detail below, to recalibrate an analyzer for use in connection with a particular type of device. In other words, assume that an analyzer has been set up to analyze a particular type of apparatus. Subsequently, various analyzer components are adjusted so that the analyzer can operate on a different type of apparatus, e.g. different sizes of engines. Then if it is desired to again use the analyzer on the original type of engine, the present transducers can be employed in connection with an oscillator driver to recalibrate the analyzer for such operation without the necessity of actually connecting the analyzer to an engine having a known unbalance.

A still further advantage of the present vibration analyzer is that it is extremely reliable in operation and is not readily damaged by the rough usage to which it is subjected in normal production line operation.

A still further advantage of the present transducer is that it is relatively simple and economical to produce and does not involve close manufacturing tolerances which might otherwise tend to add to its cost and impair its ruggedness.

These and other objects and advantages of the present invention will be more readily understood from the following detailed description of the drawings illustrating one preferred embodiment of the invention.

In the drawings:

FIGURE 1 is a perspective view of a preferred form of transducer.

FIGURE 2 is a longitudinal, cross sectional view taken along line 2—2 of FIGURE 1.

FIGURE 3 is a transverse, cross sectional view taken along line 3—3 of FIGURE 2.

FIGURE 4 is a diagrammatic view showing the manner in which the present vibration pickup is connected to an unbalance analyzer.

FIGURE 5 is a diagrammatic view showing the manner in which the present vibration pickup is connected to an oscillator driver and unbalance analyzer during a check or recalibration procedure.

More particularly, as is best shown in FIGURES 1–3, the present vibration pickup 10 comprises a cylindrical housing 11 which is closed at opposite ends by means of end cap members 12 and 13. These members are joined to cylindrical housing 11 as by means of bolts 14 which pass through openings in the end cap and threadably engage tapped bores in the cylindrical housing.

End member 12 carries an electrical connector 15. This connector is secured to end cap 12 by means of bolts 16 and is provided with a threaded, peripheral surface 17 adapted for engagement with a mating connector. Connector member 15 is further provided with three lugs 18, 20 and 21 for providing an electrical connection between insulated leads 22, 23 and 24 and the exterior of the vibration pickup, through connector 15 and a cooperating connector (not shown).

The opposite end cap member 13 carries means for securing the vibration pickup to the apparatus to be analyzed, such as an internal combustion engine. As shown in FIGURES 1 and 2, this connection is in the form of a stud 25 which threadably engages end cap 13 and is adapted to be threaded into an opening in the engine being tested or in some other element secured to the engine. It is to be understood that the exact details of the connection between the transducer housing and the apparatus being tested constitute no part of the present invention and any suitable form of coupling can be employed.

It will also be appreciated that pickup 10 is effective to analyze vibrations in one correction plane of the device being tested. In many cases the apparatus being analyzed has two, or even more, correction planes. Accordingly, additional pickup units 10 are mounted to sense vibrations in these other correction planes and are connected to other terminals of the analyzer.

Vibration pickup 10 further includes two disc-like end plates 26 and 27. These plates are preferably formed of a suitable plastic material, such as Teflon, and are disposed in abutment with the inner surfaces of end cap members 12 and 13. Each of the end plate members 26 and 27 is provided with annular shoulders 28 and 30 which engage spacer rings 31 and 32. These spacer rings fit closely within the cylindrical opening formed in housing member 10.

Two armature supporting diaphragms 33 and 34 of generally circular outline are clamped between spacer rings 31 and 32 and a second set of spacer rings 35 and 36. Each of the spacer rings 35 and 36 is annular in cross section as is best shown in FIGURE 2. The end of one leg of each spacer ring 35 and 36 clamps the peripheral portion of a diaphragm 33, 34 against the cooperating spacer ring 31, 32.

The pickup housing further carries two annular pole pieces 37, 38. These pole pieces are formed of a suitable ferromagnetic material, such as iron. Pole pieces 37 and 38 are of slightly lesser diameter than the inner diameter of cylindrical housing member 11. The outer end of each of the pole pieces abuts an inwardly extending radial arm of spacer members 35, 36. The adjacent ends of pole members 37 and 38 are separated and abutted by a center spacing ring 40 formed of a suitable non-ferromagnetic material, such as Teflon and the like.

It is to be understood that the longitudinal dimensions of end plates 26 and 27, spacer members 31 and 32, diaphragm members 33 and 34, angulated spacer rings 35 and 36, pole pieces 37 and 38 and center ring 40 are such that when the end cap members 13 and 14 are bolted tightly against cylindrical housing 11, the diaphragm members 33 and 34 are tightly clamped about their periphery.

Angulated spacer members 35 and 36 and center ring 40 also serve to position two bobbin members 41 and 42. These bobbin members are generally of tubular configuration and include outer shoulders 43 in abutment with the radial arm of spacer members 35 and 36 and shoulders 44 disposed in abutment with walls of center ring 40. Each of the bobbins 41 and 42 is formed of a non-ferromagnetic material, such as a plastic; for example, Teflon or Debrin.

Each of the bobbins is provided with two circumferential grooves for receiving wound stationary coils 45, 46, 47 and 48. It is to be noted that, as indicated in FIGURES 4 and 5, the two coils associated with each bobbin are reversely wound. For example, coil 45 is wound in a right-hand configuration, while coil 46 is wound in a left-hand configuration. Similarly, coil 47 is wound in a right-hand configuration, while coil 48 is wound in a left-hand configuration.

Three output leads are taken from these coils as shown in FIGURES 2, 4 and 5. More particularly, lead 22 is taken from the left-hand end of coil 45, while lead 23 is taken from the right-hand end of coil 48. Lead 24 is tied to the adjacent ends of coils 46 and 47. It is to be understood that the size of leads 22, 23 and 24 is exaggerated in FIGURE 2 for purposes of clarity. In actual practice these leads are of considerably smaller diameter and are held in place by suitable insulating tape (not shown). It is also to be understood that coils 45–48 are held stationary relative to housing 10.

The pickup unit further includes an inertial armature assembly 50 which is shiftable relative to housing 10. More particularly, the armature assembly 50 tends to remain stationary because of its inertia; or in any event undergoes a substantially smaller displacement than housing 11 which is connected to the apparatus being tested.

Specifically, armature assembly 50 includes a shaft 51 of non-ferromagnetic material, such as brass. This shaft extends longitudinally of the cylindrical housing member 11 coaxially therewith. Each end of the shaft 51 passes through a circular opening formed in one of the diaphragms 33, 34. The shaft is rigidly secured to the diaphragms since each end of the shaft carries a spacer sleeve 52, 53 which abuts the inner face of the diaphragm while nuts 54 and 55 threadably engage the ends of the shaft 51 and are drawn tightly against the outer faces of diaphragm 33, 34.

The construction of the diaphragms 33, 34, which are identical, is shown in FIGURE 3. As there shown, diaphragm 34 is formed of a thin sheet of resilient metal, such as beryllium-copper, Phosphor bronze, or the like. The diaphragms 33, 34 function as two springs permitting the shaft 51 to move longitudinally relative to the housing, while at the same time providing a restoring force tending to return shaft 51 to its normal rest position shown in FIGURE 2.

Each of the diaphragms includes a plurality of inwardly spiraling cuts 56. The cuts are interspersed and terminate short of the outer periphery of the diaphragm and also short of the central shaft receiving opening of the diaphragm. The spiral ribbons, or reeds, 57 defined by the cuts 56 substantially increase the flexibility of the diaphragms to facilitate linear axial movement of shaft 51. At the same time, the reeds limit transverse movement of the shaft and also provide a restoring force upon the shaft as mentioned above.

Shaft 51 carries two annular magnets 58 and 60. These magnets are positioned so that magnet 58 is symmetrically spaced between and relative to coils 45 and 46 and magnet 60 is symmetrically spaced between and relative to coils 47 and 48. The exact construction of annular magnets 58 and 60 constitutes no part of the present invention. I have, however, determined that one suitable form of magnet is an alnico magnet which is magnetized parallel to the diameter of the magnet, i.e. parallel to the axis of shaft 51.

Two annular ferromagnetic pole pieces 61, 62 are carried by shaft 51 on opposite sides of magnet 58. Similarly, two annular ferromagnetic pole pieces 63 and 64 are carried by shaft 51 on opposite sides of annular magnet 60. A non-ferromagnetic sleeve member of spacer sleeve 65, formed of aluminum, plastic or the like, is carried by shaft 51 intermediate pole pieces 62 and 63.

The armature assembly 50 further includes two plastic end discs 66 and 67 which have central openings receiving the shaft and abutting the outer face of pole pieces 61 and 64 respectively. The outer face of discs 66 and 67 are in abutment with spacer sleeves 53 and 52. As a result, there is no relative movement between any of the elements of the rotor assembly. Rather, they all move in unison. The plastic discs 66 and 67 are preferably of a slightly greater diameter than pole pieces 61–64. Consequently, as the rotor assembly is shifted transversely, i.e. radially relative to housing 10, a resilient motion limiting abutment occurs between plastic 66 and 67 and plastic bobbin members 41 and 42. Additionally, if excessive longitudinal motion occurs between the rotor assembly and housing, motion of the armature 51 relative to the housing is resiliently limited by the engagement of nuts 54 and 55 on the rotor by plastic end plate members 26 and 27.

One manner of using the vibratory pickup is shown diagrammatically in FIGURE 4. As there shown, lead 22 of pickup unit 10 is connected to an unbalance analyzer. One suitable form of unbalance analyzer is shown in the pending patent application of Richard E. Porter for "Assembly Balancer," Ser. No. 449,847. In the setup shown in FIGURE 4, lead 23 is grounded while lead 24 provides a series connection between windings 46 and 47.

The outer housing of the vibration pickup is connected to the vibrating surface in any suitable manner, such as by means of stud 25. Consequently, the housing of the pickup is vibrated in the same manner as the surface to which it is secured. However, the only interconnection between the armature assembly in the housing is through the two spring diaphragm members 33 and 34. It will be appreciated that the armature assembly, including shaft 51, cylindrical magnets 58 and 60, spacers 52, 53 and 65, pole pieces 61, 62, 63 and 64, and plastic discs 66 and 67, is relatively heavy and possesses an appreciable amount of inertia. As a result, the stator assembly tends to remain stationary; although, of course, a small amount of oscillatory movement is imparted to the armature assembly through the diaphragm members. Consequently, the housing and components rigidly mounted thereto, including coils 45, 46, 47 and 48, are oscillated longitudinally relative to magnetic pole pieces 61–64. The coils 45–48 thus cut the magnetic fields of force due to the presence of the rotor magnets and an output current signal is generated which is fed to the unbalance analyzer.

More specifically, consider the left-hand pair of pole pieces 61 and 62 which are magnetized with the polarity shown in FIGURE 4 by cylindrical magnet 58. Lines of force from pole piece 62 pass through coil 46, outer pole piece 37, and winding 45 to magnet 61. However, since windings 45 and 46 are oppositely wound, the currents generated in these windings are additive.

Windings 45 and 46 are connected in series through lead 24 to windings 47 and 48. A flux path is established through windings 47 and 48 from pole piece 63, outer pole piece 60 and pole piece 64. Again, however, the windings 47 and 48 are reversed so that the current generated is additive. Indeed, windings 45–48 are all series connected and movement of the armature in one direction induces a current flow in the same direction in each of the windings. Upon return movement of the armature in the opposite direction, a current of the opposite polarity is induced in each of the windings. As a result, an alternating voltage is applied to the analyzer through lead 22 which depends upon the vibratory velocity sensed by the pickup.

The present vibratory pickup is also adapted for use to provide a self-check upon itself and upon the vibration analyzer. A setup for accomplishing this is shown diagrammatically in FIGURE 5. As there shown, lead 23 is connected to the same unbalance analyzer previously discussed. Line 24, which interconnects windings 46 and 47, is grounded and is connected to the output of an oscillator driver. It is to be understood that the grounding of lead 24 and the connections of leads 22 and 23 to the unbalance analyzer and oscillator driver are effected by conventional switching circuits (not shown), but preferably built into the analyzer.

The oscillator driver is effective to apply a suitable signal to coils 45 and 46. This signal, for example, may be a sine wave having a frequency of the same order as the frequency of the vibrations normally sensed by pickup 10, e.g. 25 c.p.s. in one typical installation. As a result of the signal applied to windings 45 and 46 by the oscillator driver, vibrations are induced into the armature due to the interaction of the magnetic field established in windings 45 and 46 and adjacent magnetic pole pieces 61 and 62. This vibratory motion in turn causes an output signal to be developed in windings 47 and 48 in the same manner described above. This output signal is fed to the unbalance analyzer through lead 23. If the proper readings are observed on the analyzer meters, the operator is assured that the vibration pickup and analyzer are functioning properly.

It is to be understood that the present vibration pickup can be used in other ways as well. For example, the vibration pickup can be used to recalibrate an analyzer that has previously been set up to analyze a particular type of engine and then has been subsequently changed to analyze a different type of engine. Suppose, for example, that the analyzer was originally set up to analyze vibrations in a 289 cubic inch, eight cylinder engine. Subsequently, the setup is to be changed to enable the analyzer to analyze a six cylinder, 220 cubic engine, and still later the analyzer is to again be used in 289 cubic inch, eight cylinder engines.

Prior to changing the analyzer for handling the six cylinder engine, the velocity pickups from both the front and rear vibration planes are removed from the engine and are placed on a horizontal table. One pair of coils 45, 46 of each pickup is connected to an oscillator driver through lead 22. The second pair of coils 47, 48 of each pickup is connected to the unbalance analyzer through lead 23. The oscillator driver thus imparts a vibratory motion to each of the armature assemblies 50, this vibratory motion being of the same order of frequency as the test crankshaft speed of the 289 cubic inch engine. As a result, the second pair of coils 47, 48 of each probe will produce signals which are applied to the unbalance analyzer. These signals cause the various meters of the analyzer, i.e. the front correction plane amount and position meters and the rear correction plane amount and position meters, to have readings. A record of these readings is noted and preserved.

In the next step, one pickup, for example, the front pickup, is disconnected from the test oscillator and the rear pickup is connected to the oscillator driver and unbalance analyzer in the same manner as described above, i.e. coils 45 and 46 of the rear pickup are connected through lead 22 to the oscillator driver while leads 47 and 48 are connected to the unbalance analyzer through lead 23. The oscillator driver is actuated to oscillate the armature assembly through coils 45 and 46; and an output signal is sent to the unbalance analyzer from coils 47 and 48. The various readings of the front and rear correction plane amount and position meters are read and noted to provide a second set of readings.

Finally, the opposite pickup (in this example the front) is connected to the oscillator driver and unbalance analyzer, while the original (rear) pickup is disconnected. Coils 45 and 46 of the front pickup are energized from the oscillator to cause oscillation of the armature assembly; and a set of the various meter readings in the analyzer is made, these readings being caused by the output signal from coils 47 and 48 which are connected to the unbalance analyzer. As a result, the operator has obtained for future use three sets of readings: one with both probes connected, one with the front probe connected and one with the rear probe connected.

The analyzer is then set up for the run of six cylinder engines. At the end of this run, assume that it is again desired to recalibrate the analyzer to ready it for the next run of 289 cubic inch, eight cylinder engines. To accomplish this, both the front and rear correction plane probes are removed from the engine being analyzed, and are placed on a horizontal table. One of the pickups, for example the rear pickup, is then connected to oscillator driver 22 and to unbalance analyzer 23 in the manner described above. The various plane separation controls of the unbalance analyzer are then manipulated so that the readings of the analyzer are the same as those previously obtained when only the rear pickup was connected.

In the next step, the rear pickup is disconnected from the oscillator and unbalance analyzer and the front pickup is connected to the oscillator driver through lead 22 and to the unbalance analyzer through lead 23. Again, the plane separation controls of the unbalance analyzer are manipulated so that the readings originally made with the front pickup connected are duplicated.

Finally, both pickups are connected to the oscillator driver and unbalance analyzer as a final check. The various meters of the unbalance analyzer should then read the same values as they did previously when both pickups were connected. Assuming that this is the case, the analyzer has now been recalibrated for operation with 289 cubic inch, eight cylinder engines. If for any reason a discrepancy is noted in the readings, the process is repeated to correct whatever error was made by the setup operator during the recalibration procedure.

From the foregoing disclosure of the general principles of the present invention and the above detailed description of a preferred embodiment and three methods of utilizing the preferred embodiment, those skilled in the art will readily appreciate not only modifications which can be made in the structure of the transducer without departing from the present invention, but also other methods in which the transducer can be employed. Accordingly, I desire to be limited only by the scope of the following claims.

Having described my invention, I claim:

1. In an unbalance analyzing system including vibration analyzing apparatus and an oscillator, the novel combination which comprises a vibration pickup, said vibration pickup comprising a housing, an armature assembly disposed with said housing, spring means mounting said armature assembly for limited axial movement relative to said housing, first and second sets of coils disposed within said housing, each set of coils consisting of two series connected component coils oppositely wound relative to one another, said coils being spaced apart in the direction of armature movement, first and second magnets disposed within said housing in transverse alignment with said coils, axial movement of said armature assembly being effective to cause relative movement between said coils and magnets, a first conductor for connecting said sets of coils in series to produce a velocity dependent signal when said housing is subjected to vibration, a second conductor joined to the end of one of said sets of coils, a third conductor joined to the end of the other of said sets of coils, means selectively grounding said second conductor and connecting said first conductor to said vibration analyzing apparatus, and means selectively grounding said first conductor, connecting said second conductor to said vibration analyzing apparatus, and for connecting said first conductor to said oscillator, whereby when said first set of coils is driven by said oscillator said armature will oscillate and said second set of coils will develop a velocity dependent signal which is applied to said vibration analyzer.

2. In combination, a vibration pickup, vibration analyzing apparatus, and an oscillator, said vibration pickup comprising a housing, an armature assembly disposed within said housing, spring means mounting said armature assembly for limited axial movement relative to said housing, first and second sets of coils disposed within said housing, each set of coils consisting of two series connected component coils oppositely wound relative to one another, said coils being spaced apart in the direction of armature movement, first and second magnets disposed within said housing in transverse alignment with said coils, axial movement of said armature assembly being effective to cause relative movement between said coils and magnets, and means for connecting said sets of coils in series to produce a velocity dependent signal when said housing is subjected to vibration, means connecting one of said sets of coils to said oscillator and the other of said sets of coils to said vibration analyzing apparatus, whereby when said first set of coils is driven by said oscillator said armature will oscillate and said second coil will develop a velocity dependent signal to be applied to said vibration analyzer.

3. In an unbalance analyzing system including vibration analyzing apparatus and an oscillator, the novel combination whcih comprises a vibration pickup, said vibration pickup producing a velocity dependent signal and comprising a housing, an armature assembly including a shaft, two spaced cylindrical magnets mounted upon said shaft, said magnets being magnetized parallel to the axis of said shaft, radially extending pole pieces mounted on opposite sides of each of said magnets, spring diaphragms, means peripherally clamping said diaphragms within said housing, means respectively securing the ends of said shaft to said diaphragms, first and second sets of coils disposed within said housing, each set of coils consisting of two series connected component coils oppositely wound relative to one another, each of said component coils surrounding and being transversely aligned with one of the pole pieces on opposite sides of an adjacent magnet of said armature, axial movement of said armature assembly being effective to cause relative movement between said coils and magnets, a first lead interconnecting said first and second sets of coils in series, a second lead connected to the end of one of the coils of said first set, and a third lead connected to one of the coils of said second set, means selectively grounding said second conductor and connecting said first conductor to said vibration analyzing apparatus, and means selectively grounding said first conductor, connecting said second conductor to said vibration analyzing apparatus, and for connecting said first conductor to said oscillator, whereby when said first set of coils is driven by said oscillator said armature will oscillate and said second set of coils will develop a velocity dependent signal which is applied to said vibration analyzer.

4. In an unbalance analyzing system including vibration analyzing apparatus and an oscillator, the novel combination which comprises a vibration pickup, said vibration pickup producing a velocity dependent signal and comprising a housing, an armature assembly including a shaft, two spaced cylindrical magnets mounted upon said shaft, said magnets being magnetized parallel to the axis of said shaft, radially extending pole pieces mounted on opposite sides of each of said magnets, spring diaphragms, means peripherally clamping said diaphragms within said housing, means respectively securing the ends of said shaft to said diaphragms, first and second sets of coils disposed within said housing, each set of coils consisting of two series connected component coils oppositely wound relative to one another, each of said component coils surrounding and being transversely aligned with one of the pole pieces on opposite sides of an adjacent magnet of said armature, a cylindrical pole member surrounding each of said component coils, axial movement of said armature assembly being effective to cause relative movement between said coils and magnets, a first lead interconnecting said first and second sets of coils in series, a second lead connected to the end of one of the coils of said first set, and a third lead connected to one of the coils of said second set, means selectively grounding said second conductor and connecting said first conductor to said vibration analyzing apparatus, and means selectively grounding said first conductor, connecting said second conductor to said vibration analyzing apparatus, and for connecting said first conductor to said oscillator, whereby when said first set of coils is driven by said oscillator said armature will oscillate and said second set of coils will develop a velocity dependent signal which is applied to said vibration analyzer.

5. A method of checking a vibration analyzer adapted to receive signals from a vibration pickup having two sets of coils, each set of coils consisting of two series connected component coils oppositely wound relative to one another and two magnets axially shiftable relative to said coils, each of said magnets being magnetized in a direction parallel to their axis of movement, said vibration analyzer being effective to analyze unbalance forces of a device having a rotating member rotated within a predetermined speed range, said method comprising the steps of removing the vibration pickup from engagement with said apparatus being tested, connecting one set of coils of said pickup to an oscillator having an output signal with a frequency within the frequency range of the apparatus being tested, applying a velocity dependent signal from a second set of coils of said pickup to said analyzer, and comparing said analyzer readings with previously observed readings.

6. A method of recalibrating a vibration analyzer adapted to receive signals from a vibration pickup having two sets of coils, each set of coils consisting of two series connected component coils oppositely wound relative to one another and two magnets axially shiftable relative to said coils, each of said magnets being magnetized in a direction parallel to their axis of movement, said vibration analyzer being effective to analyze unbalance forces of a particular type of device having a rotating member rotated within a predetermined speed range, said method comprising the steps of removing said vibration pickup from engagement with the device being tested, connecting one coil of said pickup to an oscillator having an output signal with a frequency within the frequency range of the device being tested, applying a velocity dependent signal from a second set of coils of said pickup to said analyzer, and adjusting components of said analyzer so that said analyzer readings coincide with readings previously obtained.

7. A method of recalibrating a vibration analyzer to analyze unbalance forces of a particular type of apparatus having a rotating member rotated within a predetermined speed range, said vibration analyzer being connected to two vibration pickups mounted adjacent two correction planes of said apparatus, each of said vibration pickups having two sets of coils and two magnets axially shiftable relative to said coils, each of said magnets being magnetized in a direction parallel to their axis of movement, said method comprising the steps of removing each of said vibration pickups from engagement with said apparatus being tested, connecting one set of coils of one of said vibration pickups to an oscillator having an output signal with a frequency within the frequency range of the apparatus being tested, applying a velocity dependent signal from a second set of coils of said pickup to said analyzer, and adjusting components of said analyzer so that said analyzer readings coincide with previously observed readings when said analyzer was adjusted to analyze said particular apparatus and was subjected to a signal from only said one vibration pickup, subsequently disconnecting said above mentioned vibration pickup from said oscillator, and connecting one set of coils of said other vibration pickup to said oscillator applying a velocity dependent signal from a second set of coils of said last named pickup to said analyzer, and adjusting components of said analyzer, so that said analyzer readings coincide with previously observed readings when said analyzer was adjusted to analyze said particular apparatus and was subjected to a signal only from said last named pickup.

References Cited by the Examiner

UNITED STATES PATENTS

| | | | |
|---|---|---|---|
| 2,661,622 | 12/1953 | Severs | 73—1 |
| 2,740,946 | 4/1956 | Geneslay | 73—71.2 X |
| 3,224,245 | 12/1965 | Alibrancli et al. | 73—1 |

LOUIS R. PRINCE, *Primary Examiner.*

S. C. SWISHER, *Assistant Examiner.*